United States Patent [19]

Mislin et al.

[11] 4,377,517
[45] Mar. 22, 1983

[54] 2-($C_{1-4}$ALKOXY)CARBONYLAMINO-4-(2'-$C_{1-4}$ALKOXY-4'-HALO-1',3',5'-TRIAZINYL-6'-AMINO)PHENYLAZONAPHTHALENEDI-SULFONIC ACIDS

[75] Inventors: Roland Mislin, Saint-Louis, France; Hanspeter Uehlinger, Basel; Max Oppliger, Allschwil, both of Switzerland

[73] Assignee: Sandoz Ltd., Basel, Switzerland

[21] Appl. No.: 159,952

[22] Filed: Jun. 16, 1980

[51] Int. Cl.[3] .................... C09B 62/085; D06P 1/382; D06P 3/10
[52] U.S. Cl. ................................. 260/153; 260/196; 260/197; 260/198; 260/199
[58] Field of Search .......................................... 260/153

[56] References Cited

U.S. PATENT DOCUMENTS

| | | | |
|---|---|---|---|
| 2,820,785 | 1/1958 | Zollinger et al. | 260/153 |
| 2,889,316 | 6/1959 | Heckendorn et al. | 260/153 |
| 2,891,941 | 6/1959 | Fasciati et al. | 260/153 |
| 2,929,809 | 3/1960 | Menzi et al. | 260/153 X |
| 3,336,284 | 8/1967 | Jager et al. | 260/154 |
| 3,655,639 | 4/1972 | Riat et al. | 260/153 |
| 4,115,378 | 9/1978 | Bien et al. | 260/146 |

FOREIGN PATENT DOCUMENTS

| | | |
|---|---|---|
| 2846201 | 5/1980 | Fed. Rep. of Germany . |
| 46156 | 12/1962 | Poland . |
| 46157 | 12/1962 | Poland . |
| 373493 | 1/1964 | Switzerland . |
| 812957 | 5/1959 | United Kingdom . |
| 1237107 | 6/1971 | United Kingdom . |
| 1311975 | 5/1973 | United Kingdom . |
| 1566278 | 4/1980 | United Kingdom . |

*Primary Examiner*—Floyd D. Higel
*Attorney, Agent, or Firm*—Gerald D. Sharkin; Richard E. Vila; Melvyn M. Kassenoff

[57] ABSTRACT

Compounds of the formula

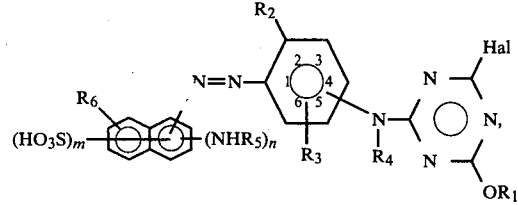

in which
$R_1$ is $C_{1-4}$alkyl,
Hal is halogen,
$R_2$ is

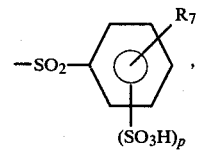

—$SO_2C_{1-4}$alkyl, —$SO_2NR_8R_9$ or —$NHCOOR_{10}$,
$R_3$ is hydrogen, $C_{1-4}$alkyl or $C_{1-4}$alkoxy,
$R_4$ is hydrogen or $C_{1-4}$alkyl,
$R_5$ is hydrogen; $C_{1-4}$alkyl; cyclohexyl; cyclohexyl substituted by one to three $C_{1-4}$alkyl groups; phenyl or phenyl substituted by one or two substituents selected from halo, $C_{1-4}$alkyl and $C_{1-4}$alkoxy,
$R_6$ is hydrogen or hydroxy, with the proviso that $R_6$ is hydrogen when $R_2$ is —$NHCOOR_{10}$,
$R_7$ is hydrogen, $C_{1-4}$alkyl or $C_{1-4}$alkoxy,
each of $R_8$ and $R_9$, independently, is hydrogen, $C_{1-4}$alkyl, $C_{2-4}$hydroxyalkyl, cyclohexyl; or phenyl or phenyl substituted by one or two substituents selected from halo, $C_{1-4}$alkyl, $C_{1-4}$alkoxy, sulfo and carboxy, with the proviso that not more than one of $R_8$ and $R_9$ is cyclohexyl, phenyl or substituted phenyl,
$R_{10}$ is $C_{1-6}$alkyl, the triazinylamino group is in the 4-position when $R_2$ is —$NHCOOR_{10}$ and otherwise is in the 4- or 5-position,
m is 1 or 2,
n is 0 or 1, and
p is 0 or 1, and the molecule contains at least two sulpho groups, and mixtures of such compounds, which compounds are in free acid or salt form and are useful as reactive dyes for dyeing and printing hydroxy group-containing and nitrogen-containing organic substrates such as leather and textile materials consisting of or comprising natural or regenerated cellulose (for example, cotton, viscose and spun rayon) or natural or synthetic polyamides (for example, wool, silk and nylon). The obtained dyeings and prints have notable fastness to light, washing, water, sweat and milling. The combination dyeings obtained when used in combination with other sulfo group-containing reactive dyes are tone-in-tone, resist catalytic fading and exhibit good fastness to light and wet treatments.

6 Claims, No Drawings

2-($C_{1-4}$ALKOXY)CARBONYLAMINO-4-(2'-$C_{1-4}$ALKOXY-4'-HALO-1',3',5'-TRIAZINYL-6'-AMINO)-PHENYLAZONAPHTHALENEDISULFONIC ACIDS

The present invention relates to fibre-reactive monoazo compounds, their preparation and use as dyestuffs.

More particularly the present invention provides compounds of formula I,

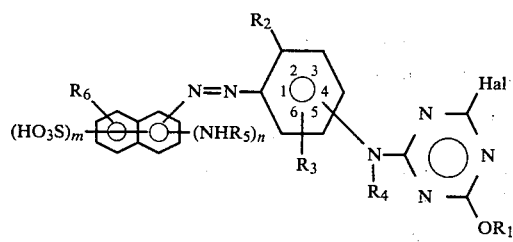

in which
$R_1$ is $C_{1-4}$alkyl,
Hal is halogen,
$R_2$ is

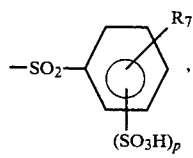

—$SO_2C_{1-4}$alkyl, —$SO_2NR_8R_9$ or —$NHCOOR_{10}$, the triazinyl-amino group is bound to the 4- or 5-position, with the proviso that when $R_2$ is —$NHCOOR_{10}$ it is bound to the 4-position, $R_3$ is hydrogen, $C_{1-4}$alkyl or $C_{1-4}$alkoxy,
$R_4$ is hydrogen or $C_{1-4}$alkyl,
$R_5$ is hydrogen; $C_{1-4}$alkyl; cyclohexyl optionally substituted by up to three $C_{1-4}$alkyl groups; phenyl optionally substituted by up to two substituents selected from the group consisting of halogen, $C_{1-4}$alkyl and $C_{1-4}$alkoxy,
$R_6$ is hydrogen or hydroxy, with the proviso that $R_6$ is other than hydroxy when $R_2$ is —$NHCOOR_{10}$,
$R_7$ is hydrogen, $C_{1-4}$alkyl or $C_{1-4}$alkoxy,
each of $R_8$ and $R_9$, independently, is hydrogen, $C_{1-4}$alkyl or $C_{2-4}$hydroxyalkyl in which the hydroxy group is in the β-, γ- or δ-position; cyclohexyl; or phenyl optionally substituted by up to two substituents selected from the group consisting of halogen, $C_{1-4}$alkyl, $C_{1-4}$alkoxy, sulpho and carboxy, with the proviso that when one of $R_8$ and $R_9$ is cyclohexyl or optionally substituted phenyl, the other has a significance other than cyclohexyl or optionally substituted phenyl,
$R_{10}$ is $C_{1-6}$alkyl,
m is 1 or 2,
n is 0 or 1,
p is 0 or 1, with the provisos:
(a) that n is only 0 and must be 0 when $R_2$ is —$NHCOOR_{10}$, and
(b) that the —$NHR_5$ and the azo groups are ortho to each other in the 1- and 2- or 2- or 1-positions of the naphthalene ring;

and the molecule contains at least two sulpho groups, and mixtures of such compounds, which compounds are in free acid or salt form and are useful as dyestuffs.

By halogen is meant fluorine, chlorine or bromine. On the triazinyl group the preferred halogens are fluorine and chlorine, especially chlorine, and any halogen on a phenyl ring is preferably chlorine or bromine, especially chlorine.

Any alkyl groups or moieties in the molecule are straight chain or branched.

$R_1$ is preferably $C_{1-3}$alkyl, especially methyl.

Any alkyl or alkoxy groups as $R_3$ preferably contain 1 or 2 carbon atoms, more preferably 1 carbon atom.

$R_3$ is preferably $R_3'$, where $R_3'$ is hydrogen, methyl, ethyl, methoxy or ethoxy. More preferably $R_3$ is $R_3''$, where $R_3''$ is hydrogen, methyl or methoxy, especially hydrogen.

Any alkyl as $R_4$ is preferably methyl. $R_4$ is preferably hydrogen or methyl, especially hydrogen.

Any alkyl as $R_5$ is preferably methyl or ethyl. Any substituted cyclohexyl as $R_5$ is preferably substituted by up to three methyl groups. Preferred substituted phenyl groups as $R_5$ are those which are substituted by up to two substituents selected from the group consisting of chlorine, methyl, ethyl, methoxy and ethoxy, especially from the group consisting of chlorine, methyl and methoxy.

$R_5$ is preferably $R_5'$, where $R_5'$ is hydrogen, methyl, ethyl, cyclohexyl, phenyl optionally monosubstituted by chlorine, methyl or methoxy. More preferably $R_5$ is $R_5''$, where $R_5''$ is hydrogen, methyl or phenyl, especially hydrogen.

Any alkyl or alkoxy as $R_7$ preferably contains 1 or 2 carbon atoms, especially 1 carbon atom.

$R_7$ is preferably $R_7'$, where $R_7'$ is hydrogen, methyl or methoxy. More preferably $R_7$ is $R_7''$, where $R_7''$ is hydrogen or methyl, especially hydrogen.

Any alkyl as $R_8$ and/or $R_9$ is preferably methyl or ethyl. Any hydroxyalkyl as $R_8$ and/or $R_9$ preferably contains 2 or 3 carbon atoms, with 2-hydroxyethyl being most preferred. Any substituted phenyl as $R_8$ or $R_9$ is preferably substituted by up to two substituents selected from chlorine, $C_{1-2}$alkyl, $C_{1-2}$alkoxy, sulpho and carboxy, especially from the group consisting of methyl and sulpho.

$R_8$ is preferably $R_8'$, where $R_8'$ is hydrogen, methyl, ethyl or 2- or 3-hydroxy($C_{2-3}$alkyl); more preferably $R_8$ is $R_8''$, where $R_8''$ is methyl, ethyl or 2-hydroxyethyl.

$R_9$ is preferably $R_9'$, where $R_9'$ is methyl, ethyl, 2- or 3-hydroxy($C_{2-3}$alkyl), cyclohexyl or phenyl optionally substituted by up to two substituents selected from the group consisting of chlorine, $C_{1-2}$alkyl, $C_{1-2}$alkoxy, sulpho and carboxy; more preferably $R_9$ is $R_9''$, where $R_9''$ is methyl, ethyl, 2-hydroxyethyl or phenyl optionally substituted by up to two substituents selected from the group consisting of methyl and sulpho.

$R_{10}$ is preferably $C_{1-4}$alkyl, more preferably methyl or ethyl.

$R_2$ as —$SO_2C_{1-4}$alkyl is preferably —$SO_2C_{1-2}$alkyl.

$R_2$ is preferably $R_{2a}$ or $R_{2b}$, where $R_{2a}$ is $$-SO_2-\underset{(SO_3H)_p}{\underset{|}{\bigcirc}}-R'_7$$

—SO$_2$CH$_3$, —SO$_2$C$_2$H$_5$ or —SO$_2$NR$_8$'R$_9$' and R$_{2b}$ is —NHCOOC$_{1-4}$alkyl. More preferably R$_{2a}$ is R$_{2a}$', where R$_{2a}$' is $$-SO_2-\underset{(SO_3H)_p}{\underset{|}{\bigcirc}}-R''_7$$

—SO$_2$CH$_3$, —SO$_2$C$_2$H$_5$ or —SO$_2$NR$_8$''R$_9$''. Most preferably R$_{2a}$ is R$_{2a}$'', where R$_{2a}$'' is $$-SO_2-\underset{(SO_3H)_p}{\underset{|}{\bigcirc}}-R''_7$$

R$_{2b}$ is preferably R$_{2b}$', where R$_{2b}$' is —NHCOOCH$_3$ or —NHCOOC$_2$H$_5$.

Preferably the compounds of formula I contain 2 sulpho groups. When R$_6$ is hydroxy m is preferably 1.

In the naphthalene ring the substituents are preferably as follows:

(a) when n is 1 with the —NHR$_5$ group in the 1-position and when R$_6$ is hydrogen and when m is 1, the sulpho group is in the 4-position and when m is 2 the sulpho groups are in the 3,6-, 3,8- or 4,6-, preferably the 3,6- or 4,6-, positions; with the —NHR$_5$ group in the 2-position and when R$_6$ is hydrogen and when m is 1 the sulpho group is in the 5-, 6- or 7-position and when m is 2 the sulpho groups are in the 3,6- or 5,7-positions;

with the —NHR$_5$ group in the 2-position and R$_6$ is hydroxy (preferably in the 8-position) and m is 1, the sulpho group is in the 6-position.

(b) when n is 0 and m is 2 with the azo group in the 1-position the sulpho groups are in the 3,6-, 3,8-, 4,6- or 4,8-positions; with the azo group in the 2-position the sulpho groups are in the 3,6-, 4,8-, 5,7- or 6,8-positions.

The —NHR$_5$ group is preferably in the 2-position of the naphthalene ring.

Preferred compounds of formula I are (i) those in which n is 1, R$_2$ is R$_{2a}$, Hal is flourine or chlorine and the compound contains 2 sulpho groups;

(ii) those of (i) in which R$_3$ is R$_3$'' and R$_4$ is hydrogen or methyl;

(iii) those of (i) or (ii) in which R$_5$ is R$_5$';

(iv) those of formula Ia

Ia
(structure shown with naphthalene-azo-phenyl-triazine system with NHR''$_5$, R'$_{2a}$, R$_6$, (SO$_3$H)$_m$, Cl, OR$_1$)

in which m is as defined above, with the proviso that m is 1 when R$_6$ is hydroxy;

(v) those of (iv) in which R$_5$'' is hydrogen;

(vi) those of (iv) or (v) in which R$_{2a}$' is R$_{2a}$'', and (vii) those of (iv), (v) or (vi) in which R$_1$ is C$_{1-3}$alkyl, especially methyl.

(viii) those of formula Ib

Ib
(structure shown with naphthalene-azo-phenyl-triazine system with R$_{2b}$, R$_4$, R$_3$'', (HO$_3$S)$_2$, Hal', OR$_1$)

in which Hal' is fluorine or chlorine;

(ix) those of (viii) in which R$_{2b}$ is R$_{2b}$', and (x) those of (viii) or (ix) in which R$_3$'' and R$_4$ are both hydrogen, Hal' is chlorine and R$_1$ is C$_{1-3}$alkyl, especially methyl.

The present invention further provides a process for the production of compounds of formula I comprising (a) coupling the diazonium derivative of a compound of formula II, II
(benzene ring with R$_3$, R'$_2$, NH$_2$, X substituents)

in which

R$_2$' is R$_2$ is defined above with the exception of the group —NHCOOR$_{10}$, X is —NO$_2$ or —NR$_4$Z$_1$ and is in the 4- or 5-position, Z$_1$ is a protecting group or is a radical of formula (a) or (b)

(a) triazine ring with Hal, N, Hal substituents
(b) triazine ring with Hal, N, OR$_1$ substituents or a mixture thereof, with a compound of formula III

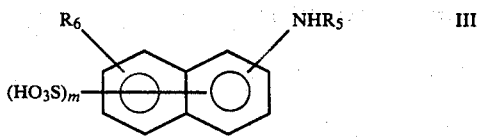

or a mixture thereof, and when $Z_1$ is (a) condensing the product with a compound $R_1OH$ and when X is nitro reducing the same or $Z_1$ is a protecting group, splitting off such group and reacting the $-NH_2$ or $-NHR_4$ group either with cyanuric halide followed by reacting the product with a compound $R_1OH$ or with a compound of formula (c)

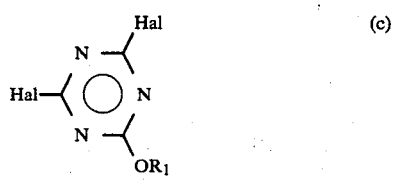

to obtain a compound of formula I in which n is 1, or (b) reacting a compound of formula IV

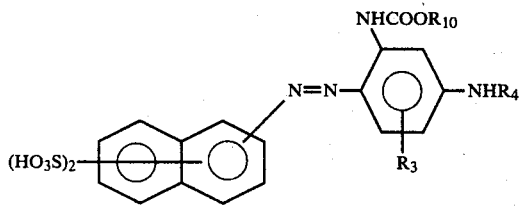

or a mixture thereof, either, with cyanuric halide followed by reacting with a compound $R_1OH$, or, with a compound of formula (c), to obtain a compound of formula I in which n is 0.

In processes (a) and (b) it is preferred to employ a compound of formula (c) rather than reacting with cyanuric halide and then with a compound $R_1OH$. The condensation reactions with cyanuric halide and $R_1OH$ or with the compound of formula (c) are carried out in accordance with known methods. The compounds of formula IV are obtained by coupling the diazonium derivative of a compound of formula V

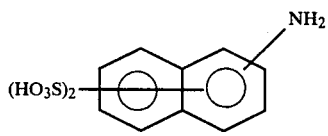

with a compound of formula VI

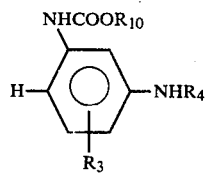

The coupling reaction is carried out in accordance with known methods, suitably in acid medium, preferably in a medium having a pH in the range of from 2.0 to 4.5.

The compounds of formula I may be isolated in accordance with known methods. It will be appreciated that, depending on the reaction and isolation conditions, the compounds of formula I may be obtained in the salt form whereby the neutralizing cation may be any of those non-chromophoric cations conventional for the salt form of reactive dyestuffs. Preferred cations are lithium, sodium and potassium, especially sodium.

The starting materials of formulae II, III, V and VI are either known or may be prepared in accordance with known methods from available starting materials.

The compounds of formula I and mixtures thereof are useful as reactive dyestuffs for dyeing or printing hydroxy group-containing or nitrogen-containing organic substrates. Preferred substrates are leather and textile materials consisting of or comprising natural or regenerated cellulose such as cotton, viscose and spun rayon, natural or synthetic polyamides such as wool, silk and/or nylon. The most preferred substrates are those textile substrates consisting of or containing wool.

The compounds of formula I, in dyebaths or with printing pastes, may be employed in accordance with conventional dyeing and printing methods for reactive dyes. For polyamide substrates it is preferred to employ exhaust dyeing methods.

The dyeings and prints obtained have notable wet-fastness (wash-, water-, sweat- and milling-fastness) and light-fastness.

The compounds of the invention are also useful as combination dyes, especially for use with other sulpho group-containing reactive dyestuffs. The combination dyeings obtained are tone-in-tone and exhibit the usual desired properties of combination dyeings, e.g. no catalytic fading, good light- and wet-fastnesses, etc.

The following Examples further serve to illustrate the invention. In the Examples all parts are by weight and the temperatures are in degrees Centigrade.

EXAMPLE 1

40.6 Parts 1-amino-2-p-toluenesulfonyl-4-(2'-chloro-4'-methoxy-1,3,5-triazinyl)aminobenzene are reacted with 25 parts 30% hydrochloric acid in 600 parts water-/acetone mixture followed by diazotization with 7 parts sodium nitrite in 50 parts water. The reaction mixture is diluted with 900 parts water, stirred for 1 hour at 0°–5° and the excess nitrous acid is decomposed with aminosulphonic acid.

The diazo suspension is added dropwise to a solution of 30.3 parts 2-aminonaphthalene-3,6-disulphonic acid in 600 parts water at 0°–5° whilst the pH is kept at 4.0–4.5 by adding 75 parts sodium acetate. The suspension is diluted with 600 parts acetone and the temperature is allowed to rise to 20°, the pH is adjusted to 8 and the product is filtered off. The product which, in free acid form is of the formula

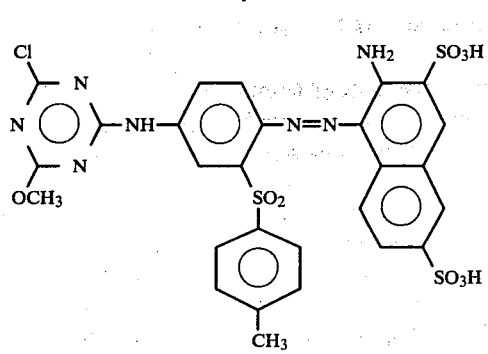

is obtained in sodium salt form and dyes polyamides, especially wool, in scarlet-red shades. The dyeings have good light- and wet-fastnesses.

In the following Table further dyes which may be prepared in analogy with the procedure of Example 1 are given. The compounds correspond to the general formula

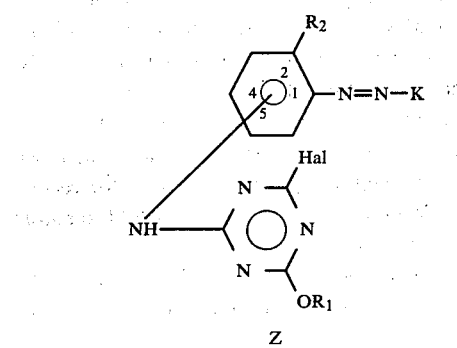

In Table 1 the symbol K denotes the following naphthalene groups ($K_1$) to ($K_{15}$)

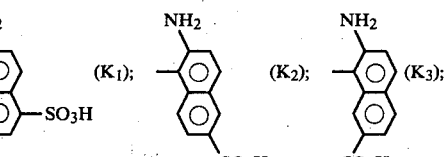

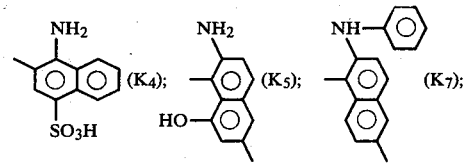

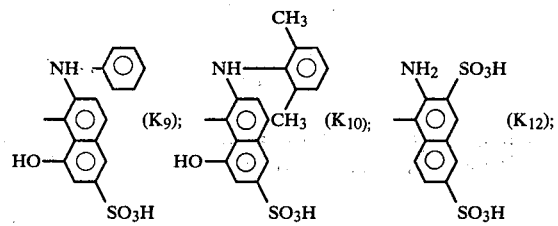

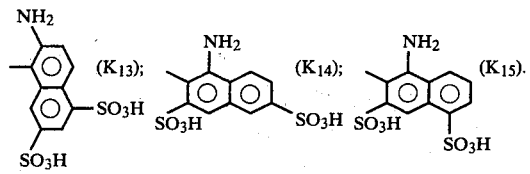

The dyeings on wool have the shades indicated in the last column of Table 1, whereby a=orange, b=scarlet-red, c=red and d=bordeaux red.

TABLE 1

| Ex. No. | K | $R_2$ | Hal | $R_1$ | position of —NH—Z | shade on wool |
|---|---|---|---|---|---|---|
| 2 | $K_1$ | —SO$_2$—⌬—SO$_3$H | Cl | CH$_3$ | 4 | b |
| 3 | $K_1$ | " | Cl | " | 5 | b |
| 4 | $K_2$ | " | Cl | " | 4 | b |
| 5 | $K_3$ | " | F | " | 5 | b |
| 6 | $K_3$ | " | Cl | $C_2H_5$ | 5 | b |
| 7 | $K_4$ | " | Cl | CH$_3$ | 5 | a |
| 8 | $K_5$ | —SO$_2$—⌬—SO$_3$H | Cl | " | 5 | c |
| 9 | $K_5$ | —SO$_2$—⌬(SO$_3$H meta) | Cl | CH$_3$ | 5 | c |
| 10 | $K_4$ | —SO$_2$—⌬(SO$_3$H, CH$_3$) | Cl | " | 5 | a |
| 11 | $K_1$ | " | Cl | " | 5 | b |
| 12 | $K_2$ | " | Cl | " | 4 | b |
| 13 | $K_3$ | " | Cl | " | 5 | b |
| 14 | $K_4$ | " | F | " | 5 | b |
| 15 | $K_5$ | " | Cl | " | 5 | c |
| 16 | $K_5$ | " | Cl | —CH(CH$_3$)$_2$ | 5 | c |

TABLE 1-continued

| Ex. No. | K | R₂ | Hal | R₁ | position of —NH—Z | shade on wool |
|---|---|---|---|---|---|---|
| 17 | $K_{10}$ | " | Cl | $CH_3$ | 5 | d |
| 18 | $K_7$ |  —SO₂—⬡—SO₃H | Cl | " | 5 | c |
| 19 | $K_{10}$ | " | Cl | " | 5 | d |
| 20 | $K_9$ | " | Cl | " | 4 | c |
| 21 | $K_{12}$ | 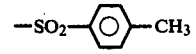 —SO₂—⬡—CH₃ | F | " | 5 | b |
| 22 | $K_{13}$ | " | Cl | " | 5 | b |
| 23 | $K_{13}$ | 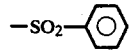 —SO₂—⬡ | Cl | $CH_3$ | 5 | b |
| 24 | $K_{12}$ | " | Cl | " | 4 | b |
| 25 | $K_{14}$ | " | Cl | " | 5 | b |
| 26 | $K_{12}$ | —SO₂CH₃ | Cl | " | 4 | b |
| 27 | $K_{12}$ | " | Cl | " | 5 | b |
| 28 | $K_{13}$ | " | Cl | $C_2H_5$ | 5 | b |
| 29 | $K_{15}$ | —SO₂C₂H₅ | Cl | $CH_3$ | 5 | b |
| 30 | $K_{12}$ | 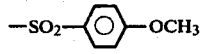 —SO₂—⬡—OCH₃ | Cl | " | 5 | b |
| 31 | $K_{12}$ | 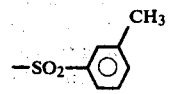 —SO₂—⬡(CH₃) | Cl | " | 5 | b |
| 32 | $K_{13}$ | —SO₂C₄H₉(n) | Cl | " | 5 | b |
| 33 | $K_{14}$ | —SO₂CH₃ | Cl | " | 4 | b |
| 34 | $K_{15}$ | 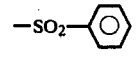 —SO₂—⬡ | Cl | " | 5 | b |
| 35 | $K_{13}$ | —SO₂N(CH₃)₂ | Cl | " | 5 | b |
| 36 | $K_{12}$ | —SO₂NHCH₃ | Cl | " | 5 | b |
| 37 | $K_{12}$ | —SO₂N(C₂H₅)₂ | Cl | " | 4 | b |
| 38 | $K_{12}$ | —SO₂N(CH₂CH₂OH)₂ | Cl | " | 5 | b |
| 39 | $K_{12}$ | 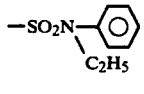 —SO₂N(C₂H₅)—⬡ | Cl | " | 5 | b |
| 40 | $K_{13}$ | 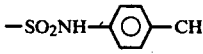 —SO₂NH—⬡—CH₃ | Cl | " | 5 | b |
| 41 | $K_{13}$ | 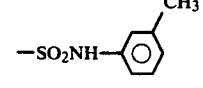 —SO₂NH—⬡(CH₃) | Cl | " | 5 | b |
| 42 | $K_{13}$ | 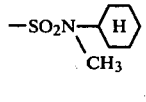 —SO₂N(H)(CH₃)—⬡ | Cl | $CH_3$ | 4 | b |
| 43 | $K_1$ | 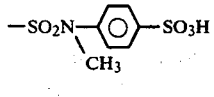 —SO₂N(CH₃)—⬡—SO₃H | Cl | $C_2H_5$ | 5 | b |
| 44 | $K_5$ | " | Cl | $CH_3$ | 5 | c |
| 45 | $K_4$ | " | Cl | " | 5 | b |

TABLE 1-continued

| Ex. No. | K | R₂ | Hal | R₁ | position of —NH—Z | shade on wool |
|---|---|---|---|---|---|---|
| 46 | K₁ | —SO₂—⟨O⟩—CH₃ (SO₃H) | Cl | C₂H₅ | 5 | b |

EXAMPLE 47

30.3 Parts 2-aminonaphthalene-6,8-disulphonic acid are stirred in 180 parts water, 100 parts ice and 14 parts 30% hydrochloric acid and are diazotized within 30 minutes at 0°-5° by the addition of 6.9 parts sodium nitrite in 25 parts water. After stirring for a further 15 minutes, the reaction is complete.

18.4 Parts 1-aminobenzene-3-carbamic acid ethyl ester are stirred in 150 parts water. The diazo suspension is added within 30 minutes to the solution whilst the pH is kept between 4 and 4.5 by adding 20 parts 30%-sodium-hydroxide solution. The dissolved dye is precipitated by the addition of 85 parts sodium chloride and is then filtered. The paste obtained is dissolved at pH 6 in 1000 parts water. 18 parts 2,4-dichloro-6-methoxy-1,3,5-triazine are added within 15 minutes at room temperature whilst the pH is kept at 5.5 to 6.0 by adding 30 parts 20% sodium carbonate solution. After condensation is complete, 100 parts sodium chloride are added and the precipitated dye is filtered. The product which, in free acid form is of the formula

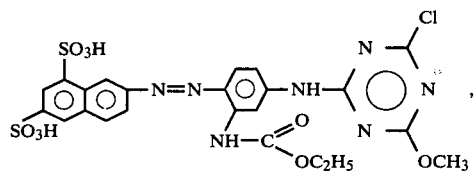

is obtained in sodium salt form. The dye gives golden-yellow dyeings on polyamides such as wool, which dyeings have good light- and wet-fastnesses.

In analogy with the procedure described in Example 47, the dyes of Table 2 which correspond to the general formula

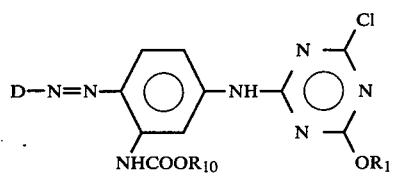

may be prepared.

In the Table the dye shade on wool is given in the last column whereby e=yellow and f=golden-yellow.

TABLE 2

| Ex. No. | amine containing D | R₁₀ | R₁ | shade on wool |
|---|---|---|---|---|
| 48 | 2-aminonaphthalene-6,8-disulfonic acid | C₂H₅ | —CH(CH₃)₂ | f |
| 49 | 2-aminonaphthalene-6,8-disulfonic acid | CH₃ | CH₃ | f |
| 59 | 2-aminonaphthalene-6,8-disulfonic acid | C₂H₅ | C₂H₅ | f |
| 51 | 2-aminonaphthalene-4,8-disulfonic acid | " | CH₃ | f |

TABLE 2-continued

| Ex. No. | amine containing D | R₁₀ | R₁ | shade on wool |
|---|---|---|---|---|
| 52 | 2-aminonaphthalene-4,8-disulfonic acid | " | —CH₂CH₂CH₃ | f |
| 53 | 2-aminonaphthalene-4,8-disulfonic acid | C₄H₉(n) | CH₃ | f |
| 54 | 2-aminonaphthalene-5,7-disulfonic acid | CH₃ | " | f |
| 55 | 2-aminonaphthalene-5,7-disulfonic acid | C₂H₅ | " | f |
| 56 | 2-aminonaphthalene-5,7-disulfonic acid | " | —CH(CH₃)₂ | f |
| 57 | 1-aminonaphthalene-3,6-disulfonic acid | " | CH₃ | e |
| 58 | 1-aminonaphthalene-4,6-disulfonic acid | " | " | e |
| 59 | 1-aminonaphthalene-4,8-disulfonic acid | " | " | e |

DYEING EXAMPLE A

1 Part of the dye of Example 1 is dissolved in 250 parts demineralized water. 5 parts unchlorinated wool cable yarn are added to the dyebath and the temperature is adjusted to 40°. 5 parts calcinated Glauber's salt, 1.5 parts glacial acetic acid and 1 part conventional levelling agent are added to the bath; the bath is heated to the boil within 90 minutes and kept at the boil for 60 minutes. During dyeing evaporated water is replaced every 15 minutes. The dyed substrate is washed in running hot water, then in running cold water (each for c. 3 minutes) and dried at approximately 70°. A scarlet-red dyeing having good light- and wet-fastnesses is obtained. Synthetic polyamide may be dyed in similar manner. Similarly, the dyes of Examples 2 to 59 may be employed to dye wool in accordance with the method described above.

3. A compound according to claim 1, or a salt thereof each cation of which is non-chromophoric, wherein $R_1$ is $C_{1-3}$alkyl,
$R_3''$ is hydrogen,
$R_4$ is hydrogen, and
Hal' is chloro.
4. A compound according to claim 1, or a salt thereof each cation of which is non-chromophoric, wherein $R_1$ is methyl.
5. A lithium, sodium or potassium salt of a compound according to claim 1.
6. The sodium salt of the compound according to claim 4 having the formula
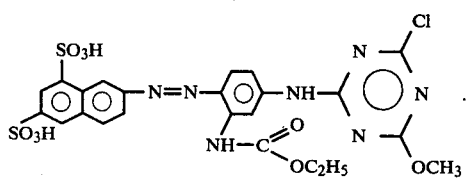

What we claim is:

1. A compound of the formula

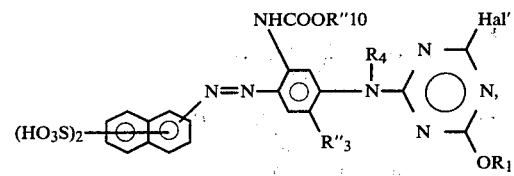

or a salt thereof each cation of which is non-chromophoric, wherein

R₁ is C₁₋₄alkyl,
R₃" is hydrogen, methyl or methoxy,
R₄ is hydrogen or C₁₋₄alkyl,
R₁₀' is C₁₋₄alkyl, and
Hal' is fluoro or chloro.

2. A compound according to claim 1, or a salt thereof each cation of which is non-chromophoric, wherein R₁₀' is methyl or ethyl.